United States Patent

[11] 3,563,492

[72] Inventor Herman A. Ferrier, Jr.
San Jose, Calif.
[21] Appl. No. 863,666
[22] Filed Sept. 10, 1969
[45] Patented Feb. 16, 1971
[73] Assignee Ampex Corporation
Redwood City, Calif.
Continuation of application Ser. No. 663,691, Aug. 28, 1967, now abandoned.

[54] CAPSTAN ACCELERATION CONTROL SYSTEM FOR WIDEBAND INSTRUMENTATION MAGNETIC TAPE TRANSPORTS
7 Claims, 1 Drawing Fig.

[52] U.S. Cl. .......... 242/184, 226/42, 226/118, 226/178
[51] Int. Cl. .......... G11b 15/46, G11b 15/58, G11b 23/12
[50] Field of Search .......... 242/182, 183, 184, 185, 201, 202, 203, 204, 206, 208, 209, 210, 75, 5175.5, 75,5267.4; 226/118, 24, 49, 95, 50, 97, 51, 42; 274/4, 11; 179/100.2; 318/6, 7

[56] References Cited
UNITED STATES PATENTS

| | | | |
|---|---|---|---|
| 3,236,429 | 2/1966 | Klein | 226/118X |
| 3,250,480 | 5/1966 | Jacoby | 242/184 |
| 3,304,018 | 2/1967 | Kurth | 242/184 |
| 3,318,545 | 2/1967 | Tobey | 242/184 |
| 3,433,426 | 3/1969 | Brown et al. | 242/184 |

*Primary Examiner*—George F. Mautz
*Attorney*—Robert G. Clay

ABSTRACT: A system for controlling capstan acceleration to prevent the tape loops from pulling out of or bottoming in the vacuum chambers during extreme speed change modes such as stop, start, and fast wind. The system is particularly applicable where relatively small, low power supply and takeup reel motors, and relatively short vacuum chambers are employed in conjunction with a low inertia, high acceleration, capstan system capable of detrimentally altering tape loop position in the vacuum chambers before the reel servos can effect equalization.

PATENTED FEB 16 1971 | 3,563,492
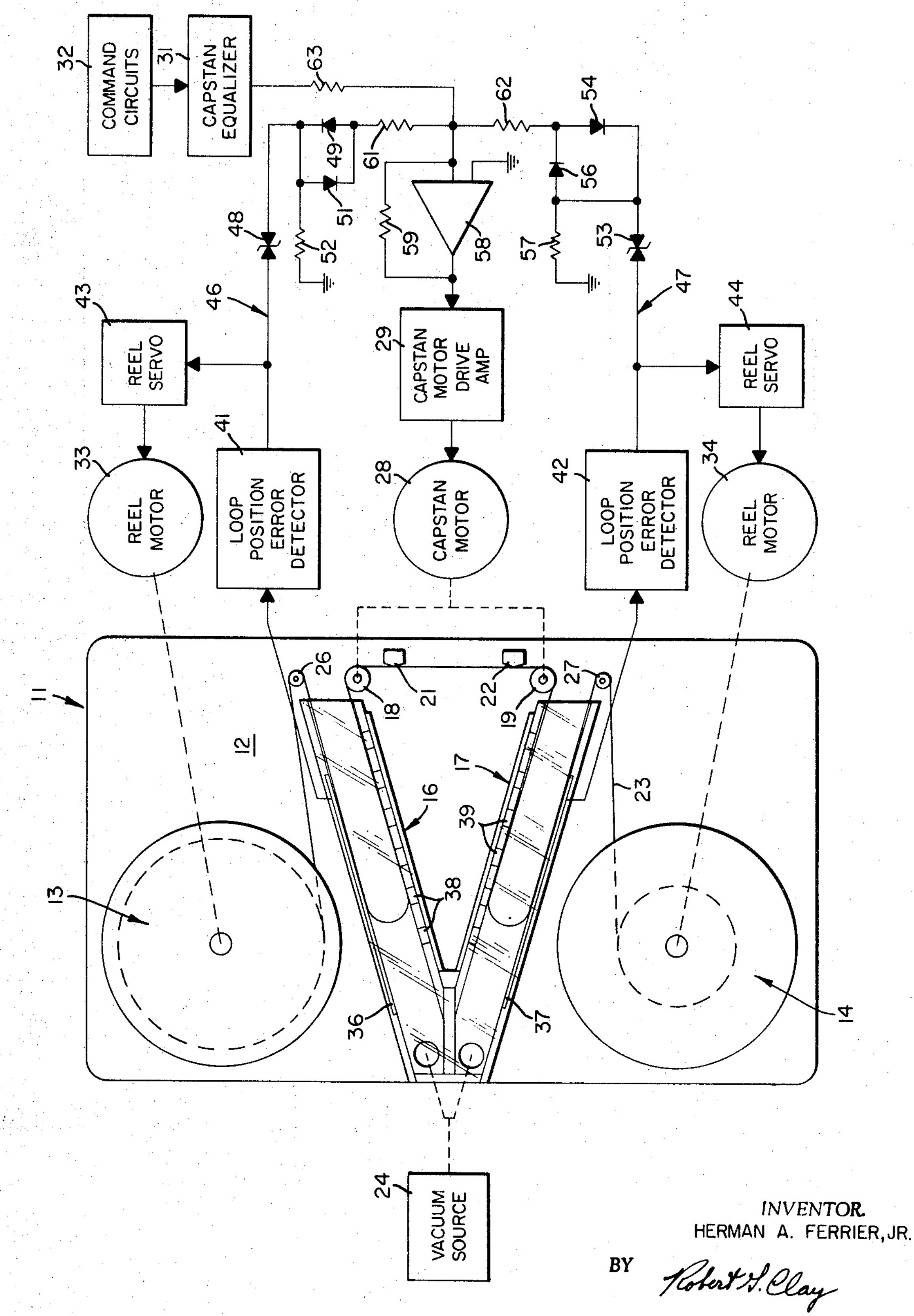
INVENTOR.
HERMAN A. FERRIER, JR.
BY Robert G. Clay
ATTORNEY

CAPSTAN ACCELERATION CONTROL SYSTEM FOR WIDEBAND INSTRUMENTATION MAGNETIC TAPE TRANSPORTS

This application is a continuation of application Ser. No. 663,691, filed Aug. 28, 1967, now abandoned.

The invention herein described was made in the course of a contract with the Department of Navy.

BACKGROUND OF THE INVENTION

Various wideband instrumentation magnetic tape transports employ vacuum chambers as compliance mechanisms for mechanically isolating the relatively large inertia tape supply and takeup reels from the relatively low inertia, high acceleration, capstan system. The tape extends from the supply reel into the first vacuum chamber to form a loop therein and then into engagement with the capstan system for pulling past the magnetic transducer head assembly. The tape extends into the second vacuum chamber to form a loop therein and then to the takeup reel. Drive motors coupled to the supply and takeup reels are controlled by reel servosystems to maintain a desired constant tape tension. Constant tension is achieved when the tape loops remain in the operating range of the vacuum chambers, i.e., in the central region of the chambers. The reel servosystems sense the positions of the loops in the chambers and when the loops deviate from the central regions thereof the reel drive motors are responsively controlled to restore the loops to the desired positions within the operating range of the chambers.

Vacuum chamber systems of the foregoing type are highly effective in maintaining constant tape tension under steady state conditions. They are also effective under dynamic conditions, such as exist during extreme modes of stop, start, fast wind, etc. provided the reel servos are sufficiently fast acting to restore the tape loops to the central regions of the chambers before the loops are pulled out of or bottom therein due to the abrupt change in capstan acceleration. Heretofore fast action of the servos has usually been assured by the use of relatively large high-power reel motors, relatively high-power motor drive amplifiers, and relatively long vacuum chambers. Where compactness and relatively low-power consumption are of importance, the use of such relatively large, high-power components is prohibited. Smaller relatively low-power components, however, cannot accelerate or decelerate the reels sufficiently fast to prevent the high acceleration or deceleration capstan from pulling the tape loops out of the chambers or causing the loops to bottom therein. Servoing the capstan to a ramp for speed changes can prevent such displacements of the tape loops out of the operating range of the chambers. However, a servosystem for this purpose is relatively complex and must be slow enough for the slowest possible reel acceleration to correct tape loop position. The rate at which capstan speed changes can be effected is correspondingly limited.

SUMMARY OF THE INVENTION

The general object of the present invention is to provide a capstan acceleration control system for appropriately slowing down or speeding up the capstan when there is danger of a loop pulling out of or bottoming in a vacuum chamber, while yet permitting capstan speed changes in the shortest possible time in response to command signals applied to the capstan servosystem. The control system is relatively simple and yet enables the tape loops to be maintained within the operating range of the vacuum chambers with relatively small low-power reel motors and drive amplifiers even when relatively short compact vacuum chambers are employed. In the accomplishment of the foregoing, the capstan acceleration control system includes a high gain negative feedback path from the tape loop position error detection portion of each reel servo to the capstan servo. Each feedback path is provided with backlash, or a dead zone, so that the path becomes active only if the tape loop leaves the central half of the vacuum chamber. The feedback paths are so arranged that when they are active, signals from the reel servos are provided to the capstan servo to control the acceleration of the capstan in compensating relation to the signals from the reel servos. By virtue of the dead zones in the feedback paths capstan acceleration is controlled by the normal signal from the capstan equalizer as long as the tape loops are positioned within the operating range of the vacuum chambers. However, when a loop is displaced out of the operating range of a chamber, the resulting reel error signal developed in the feedback loop is productive of altering the effect of the capstan equalizer signal to adjust the acceleration of the capstan in a direction to rapidly restore the loop to a position within the operating range.

BRIEF DESCRIPTION OF THE DRAWING

The single FIGURE is a combined, simplified elevational view, partially block diagram and schematic form, of a magnetic tape transport utilizing a capstan acceleration control system in accordance with the present invention.

DETAILED DESCRIPTION OF THE PREFERRED EMBODIMENT

Referring now to the drawing there is shown a typical instrumentation type transport 11, such as may employ a capstan acceleration control system in accordance with the present invention to good advantage. The details of the transport which are not concerned with the particularly salient aspects of the invention have either been omitted or illustrated generally where possible in order to simplify the description since they are conventional and well known in the art.

Basically, the transport includes a front panel 12 upon which tape supply and takeup reels 13 and 14, a pair of vacuum chambers 16 and 17, and a centrally disposed capstan drive mechanism, in the illustrated case a pair of capstans 18 and 19, are arranged symmetrically in a compact configuration. Each of the vacuum chambers 16 and 17 is positioned between one of the capstans 18 and 19 and a respective one of the reels 13 and 14 to effect mechanical decoupling of the tape path in the region of the recording and reproducing means (herein depicted as record and reproduce heads 21 and 22 intermediate the capstans) from the high inertia reels 13 and 14. Although the recording and reproducing means are represented as merely the record and reproduce heads 21 and 22 for longitudinal recording on and reproduction from the tape 23, it should be noted that numerous alternative means might be provided including a rotary head drum for transverse recording and reproducing.

Each of the vacuum chambers 16 and 17 includes a vacuum port coupled to a vacuum source 24 so that the tape 23 may be drawn into the chamber in route between one of the capstans and reels to form a loop of variable length which constitutes the buffer needed for mechanical decoupling. In this regard, the tape extends from the supply reel 13, about an idler guide 26 at the entrance region of chamber 16, into the chamber and out of the chamber in the configuration of an open loop, around the capstan 18 at the exit region of chamber 16, past the record and reproduce means, around the capstan 19 at the entrance region of chamber 17, into and out of chamber 17 in the configuration of an open loop, and around an idler guide 27 at the exit region of chamber 17 onto the takeup reel 14.

The capstans 18 and 19 are coupled together, as by means of a belt and pulley drive, and one capstan is connected to a capstan motor 28. The capstan motor thus drives both capstans at the same speed. Energization of the capstan motor is effected by means of a capstan motor drive amplifier 29 having its input coupled, in a manner subsequently described, to a conventional capstan equalizer 31 controlled by suitable command circuits 32. The equalizer generates an error signal which, when coupled by the drive amplifier to the capstan motor, serves to servo the capstans to drive the tape in accordance with command signals provided by the command circuits.

In order to maintain the length of the tape loops within the operating range of the vacuum chambers 16 and 17 so as to maintain a substantially constant tape tension, each of the reels 13 and 14 is driven by an associated reel motor 33 or 34 respectively, which is coupled in a servo loop deriving driving signals from loop position sensing means in the sides of the chambers. The position sensing means may be differential pressure switches, or more preferably photocells 36 and 37 located on one side of the respective chambers and receiving light from light sources 38 and 39 on the other side. Signals generated by the photocells are indicative of loop position since the amount of light received by each photocell from its associated source is determined by the depth to which the intervening tape loop extends into the chamber. The position signals from the photocells 36 and 37 are applied to loop position error detectors 41 and 42 which generate bipolar error signals representative of departures of the tape loops from desired positions centrally of the chambers. The error signals are applied to reel servos 43 and 44 which operate to control movement of the reel motors 33 and 34 so that the reels 13 and 14 are turned appropriately to withdraw tape from, or supply tape to, the chambers as required to maintain the tape loops in the central regions of the chamber.

It will be appreciated that to the extent described to this point the tape transport and associated circuitry are conventional. In extreme operational modes such as start, stop, fast wind, etc., there is danger of the tape loops pulling out of, or bottoming in the vacuum chambers due to rapid changes in the acceleration of the capstans 18 and 19. This is particularly the case where relatively small low-power reel motors and associated low-power drive amplifiers are employed such that movement of the relatively high-inertia reels cannot be effected sufficiently fast to compensate for rapid changes in acceleration of the relatively low-inertia capstans. The capstan acceleration control system of the present invention overcomes the foregoing difficulties by providing negative feedback paths 46 and 47 between the loop position error detectors 41 and 42 of the reel servosystems, and the capstan servo system. The feedback paths are so arranged that an error signal from either of the loop position detectors 41 or 42, indicative of a loop being entirely out of the central operating region of one of the vacuum chambers 16 or 17, is effective to alter the effect of, preferably, by overriding, the error signal from the capstan equalizer 31 and adjust the acceleration imparted to the capstans 18 and 19 from capstan motor 28 in a direction to restore the loop to the central operating range of the chamber. For example, consider the capstans to be abruptly rapidly accelerated to an extent that the reel servos are unable to compensate by correspondingly rapidly accelerating the respective reels 13 and 14 to prevent the loop from pulling out of chamber 16 and the loop from bottoming in chamber 17. The loops are thus displaced from the central operating regions of the chambers such that relatively large order error signals are generated by the loop position detectors 41 and 42. The coupling of the feedback paths 46 and 47 and the capstan equalizer 31 to the capstan motor drive amplifier 29 is such that the error signal from either position detector overrides the error signal from the equalizer and causes the capstan motor 28 to decrease the acceleration of the capstans. The decreased capstan acceleration in conjunction with the increased acceleration of the reels due to the reel servos 43 and 44 responding to the loop position error signals cause the loops to be rapidly restored to the central region of the chambers. The loop position error signals then decrease sufficiently that they are no longer effective in controlling the capstan drive motor 28 and control thereof proceeds in the normal manner in response to the error signal from the capstan equalizer 31. When the capstans are rapidly decelerated to an extent that the tape loops are displaced from the central regions of the chambers in directions opposite to those considered hereinbefore, the polarities of the loop position error si signals reverse. Control of the capstan motor by the feedback paths 46 and 47 then proceeds in a similar but opposite manner to that described.

Considering now the feedback paths 46 and 47 in greater detail, it is to be noted that same include means for providing a dead zone, or backlash, in the error signal transfer characteristics thereof. The dead zones render the loop position error signals ineffective to control the capstan motor 28 unless the tape loops are critically displaced from the central operating regions of the vacuum chambers. Control of the capstans in the normal manner responsive to the error signal from the capstan equalizer 31 is thus facilitated. In the preferred arrangement, the dead zone means in feedback path 46 include a bipolar Zener diode 47, or equivalent breakdown device, connected to the output of loop position error detector 41. A pair of parallel back-to-back crystal diodes 49 and 51 are preferably in turn connected to Zener diode 48 and a resistor 52 is provided with one end connected to the junction between the Zener diode and crystal diodes and the other end connected to ground. The crystal diodes and resistor serve to drain leakage currents through the Zener diode to ground and thereby provide a more precise dead zone in the transfer characteristic. The net result is a transfer characteristic having a dead zone of substantially zero current output for a relatively wide range between predetermined substantially equal and opposite polarity voltage inputs. The current outputs substantially linearly increase bipolarly for input voltage beyond the opposite limits of the dead zone. As an example, the output of loop position error detector 41 may swing ±12 volts for a loop travel of the full length of chamber 16. The diodes are then arranged to provide a transfer characteristic with a dead zone of approximately ±6 volts. For voltages between +6 and +12 volts, the output current substantially linearly increases in the positive direction. For voltages between −6 and −12 volts, the output current substantially linearly increases in the negative direction.

The dead zone means in feedback path 47 similarly preferably include a bipolar Zener diode 53 connected to the output of loop position error detector 42, and a pair of parallel back-to-back crystal diodes 45 and 56 in turn connected to Zener diode 53. The common junction between Zener diode 53 and crystal diodes 45 and 56 is connected to one end of a resistor 57, the other end of which is connected to ground. Such dead zone means in feedback path 47 function in a manner analogous to that described relative to the dead zone means in feedback path 46.

Coupling of the feedback paths 46 and 47 and the capstan equalizer 31 to the capstan motor drive amplifier 29 is preferably facilitated by means of a summing device. The summing device advantageously includes an operational amplifier 58 having its output connected to capstan motor drive amplifier 29, a feedback resistor 59 connected between its output and a first input, and a second input connected to ground. Resistors 61 and 62 respectively connected the parallel diodes 49 and 51 and parallel diodes 54 and 56 of feedback paths 46 and 47 to the first input of the amplifier, while a resistor 63 connects the capstan equalizer thereto. To achieve the preferred overriding effect, the resistors 61 and 62 are selected to be small relative to resistor 59 while resistor 63 is selected to be comparable thereto. The resulting output of the amplifier is nearly equal to $$-\left(\frac{R_{59}}{R_{61}}V_1+\frac{R_{59}}{R_{62}}V_2+\frac{R_{59}}{R_{63}}V_3\right)$$

where $R_{59}$, $R_{61}$, $R_{62}$, and $R_{63}$ are respectively the resistances of resistors 59, 61, 62, and 63, and $V_1$, $V_2$, $V_3$ are error signals from respectively feedback path 46, feedback path 47, and capstan equalizer 31. It will be thus appreciated that in the presence of an error signal $V_1$ or $V_2$ from one of the feedback paths, the error signal $V_1$3 from the capstan equalizer has negligible effect and is hence overriden. The foregoing will become more readily apparent upon considering an example wherein $R_{63} = = R_{59}$ and $R_{61}$ and $R_{62}$ are each 1/10 $R_{59}$. The output of the amplifier is then nearly equal to $-(10V_1 + 10V_2 + V_3)$ V3) and the feedback path error signals are ten times as effective as the equalizer error signal. From this expression of the output of the amplifier 58, it is seen that if tape 23 is rapidly accelerated to be transported in a direction, for example, from the supply reel 13 to the takeup reel 14, an error signal provided by the loop position error detector 42 via feedback path 47 indicating, for example, a displacement of the tape loop towards the bottom of the chamber 17, will be of the same sense as an error signal provided by the loop position error detector 41 via feedback path 46 indicating the other tape loop is being pulled out of the chamber 16. Since the senses of the error signals provided via the feedback paths 46 and 47 are opposite for displacements of the loops in opposite directions from the central operating regions of the vacuum chambers, the senses of the error signals will be reversed but still alike if tape loop is displaced towards being pulled out of the chamber 17 and the other tape loop is displaced towards the bottom of chamber 16, such as would occur when rapidly accelerating tape 23 in the direction from the tape of reel 14 to the supply reel 13. Hence, regardless of the direction the tape 23 is being transported, the error signals provided by the loop position error detectors 21 and 42 will be of the proper sense to correct the acceleration of the capstans 18 and 19 to restore and maintain tape loops in central operating regions of the vacuum chambers 16 and 17.

In the overall operation of the capstan acceleration control system of the present invention, the tape 23 is moved by the capstans 18 and 19 in the normal manner in accordance with an error signal developed by the capstan equalizer, provided the tape loops are maintained within the central operating regions of the vacuum chambers 16 and 17 by means of the servo systems associated with the tape supply and takeup reels 13 and 14. The error signals developed by the loop position error detectors 41 and 42 to control reel motors 33 and 34 are within the dead zones of the transfer characteristics of feedback paths 46 and 47 as long as the tape loops are within the central operating regions of the chambers. The loop position error signals at this time have negligible effect at the input of operational amplifier 58 and the capstan motor 28 is hence controlled solely by the error signal from the capstan equalizer 31. However, when either tape loop is displaced from the central operating region of its associated chamber and there is danger of the loop pulling out of, or bottoming in the chamber, the error signal developed by the corresponding loop position error detector is outside of the dead zone of the transfer characteristic of the feedback path connected thereto. The loop position error signal overrides the capstan equalizer error signal at the input of operational amplifier 58 by virtue of the relative proportions of resistors 59, 61, 62 and 63. The capstan motor 28 is consequently controlled by the loop position error signal to vary the acceleration of the capstans 18 and 19 in a direction to rapidly restore the tape loop to the central operating region of the chamber. The tape loop position error signal is correspondingly reduced to within the dead zone of the feedback path and normal control of the capstan acceleration by the capstan equalizer is resumed.

I claim:

1. In a magnetic tape transport of the type including tape supply and takeup reels, capstan means for controlling the movement of tape past record and reproducing means intermediate said supply and takeup reels, a pair of vacuum chambers respectively disposed between said capstan means and said supply and takeup reels, said tape extending into said vacuum chambers in the form of variable length open loops, supply and takeup reel motors coupled in driving relation to said supply and takeup reels, tape loop position-sensing means associated with each of said chambers for developing signals representative of the position of said tape loop therein, a tape loop position error detector coupled to each of said loop position-sensing means for developing a bipolar loop position error signal indicative of displacements of said loop from the center of said chamber, reel servo means respectively coupled to said loop position error detectors and to said reel motors to control the rotations of said supply and takeup reels in compensatory relation to said loop position error signals, a capstan motor coupled in driving relation to said capstan means, a capstan motor drive amplifier coupled in energizing relation to said capstan motor, and capstan servo equalizer means coupled to said capstan motor drive amplifier for applying a capstan error signal thereto to control the rotation of said capstan means in compensating relation to said capstan error signal, a capstan acceleration control system comprising a pair of negative feedback paths respectively coupled between said tape loop position error detectors and said capstan motor drive amplifier, means within each of said feedback paths for establishing a transfer characteristic having a dead zone extending between predetermined limits of said loop position error signals, and combining means within said feedback paths for combining said loop position error signals and said capstan error signal for application to said capstan motor drive amplifier, said loop position error signals applied to said combining means to control the acceleration of the capstan in compensating relation to said loop position error signals.

2. The combination of claim 1 wherein said loop position error signals and said capstan error signal are applied to said capstan motor drive in relative proportions to override said capstan error signal with one of said loop position error signals.

3. The combination of claim 2, further defined by said means within each of said feedback paths for establishing a transfer characteristic having a dead zone including a bipolar breakdown discharge device having a negligible output over a range of bipolar inputs.

4. The combination of claim 3, further defined by said discharge device being a bipolar Zener diode.

5. The combination of claim 2, further defined by said means within each of said feedback paths for establishing a transfer characteristic either a dead zone comprising a bipolar Zener diode coupled to each of said loop position error detectors, a pair of parallel back-to-back crystal diodes connected between said Zener diode and said combining means, and a resistor connected at one end to the common junction of said Zener diode and crystal diodes and at the other end to ground.

6. The combination of claim 2, further defined by said combining means comprising an operational amplifier and a resistor connected between the output and an input of said operational amplifier, second and third resistors respectively coupling the transfer characteristic establishing means in said feedback paths to said input of said operational amplifier, and a fourth resistor coupling said capstan servo equalizer means to said input of said operational amplifier, said second and third resistors having small resistances relative to that of said first resistor, said fourth resistor having a resistance comparable to that of said first resistor.

7. The combination of claim 6, further defined by said means within said feedback paths for establishing transfer characteristics having dead zones comprising a bipolar Zener diode coupled to a first of said loop position error detectors, a pair of parallel back-to-back crystal diodes connected between said Zener diode and said second resistor, a fifth resistor connected at one end to the common junction between said Zener diode and crystal diodes and at the other end to ground, a second bipolar Zener diode coupled to a second of said loop position error detectors, a second pair of parallel back-to-back crystal diodes connected between said second Zener diode and said third resistor, and a sixth resistor connected at one end to the common junction between said second Zener diode and second pair of crystal diodes and at other end to ground.